United States Patent [19]

Schiefer

[11] Patent Number: 4,474,516

[45] Date of Patent: Oct. 2, 1984

[54] ANCHOR BOLT ASSEMBLY

[75] Inventor: Erwin Schiefer, Munich, Fed. Rep. of Germany

[73] Assignee: Hilti Aktiengesellschaft, Schaan, Liechtenstein

[21] Appl. No.: 380,887

[22] Filed: May 21, 1982

[30] Foreign Application Priority Data

May 25, 1981 [DE] Fed. Rep. of Germany ....... 3120809

[51] Int. Cl.³ ............................................. F16B 13/06
[52] U.S. Cl. ....................................... 411/44; 411/55; 411/73; 411/75
[58] Field of Search ........................ 411/44, 45, 54, 55, 411/57, 60, 63, 64, 66, 70, 73, 75, 61, 479

[56] References Cited

U.S. PATENT DOCUMENTS

| | | | |
|---|---|---|---|
| 2,573,498 | 10/1951 | Scott | 411/71 |
| 3,033,624 | 5/1962 | Biesecker | 411/45 X |
| 3,425,311 | 2/1969 | Levy | 411/479 |
| 3,750,526 | 8/1973 | Lerich | 411/61 |
| 3,922,947 | 12/1975 | Leonardo et al. | |
| 4,284,379 | 8/1981 | Chaiko | 411/61 |

FOREIGN PATENT DOCUMENTS 126409 10/1949 Sweden ................................ 411/268
1089586 11/1967 United Kingdom ................. 411/61

Primary Examiner—Thomas J. Holko
Attorney, Agent, or Firm—Toren, McGeady and Stanger

[57] ABSTRACT

An anchor bolt assembly includes an anchor bolt and an expansion sleeve. The anchor bolt has a leading end and a trailing end and includes a cylindrically shaped body extending from the trailing end toward the leading end. A frusto-concial part extends from the leading end toward the trailing end. A reduced diameter part interconnects the adjacent ends of the body and the frusto-conical part. The reduced diameter part has a diameter smaller than that of the cylindrically shaped body and equal to the minimum diameter of the frusto-conical part. The expansion sleeve is fitted onto the reduced diameter part by deforming it inwardly into partial surface contact with the reduced diameter part. The expansion sleeve has at least one deformable web permitting it to be expanded radially outwardly for anchoring the bolt in a borehole.

10 Claims, 3 Drawing Figures

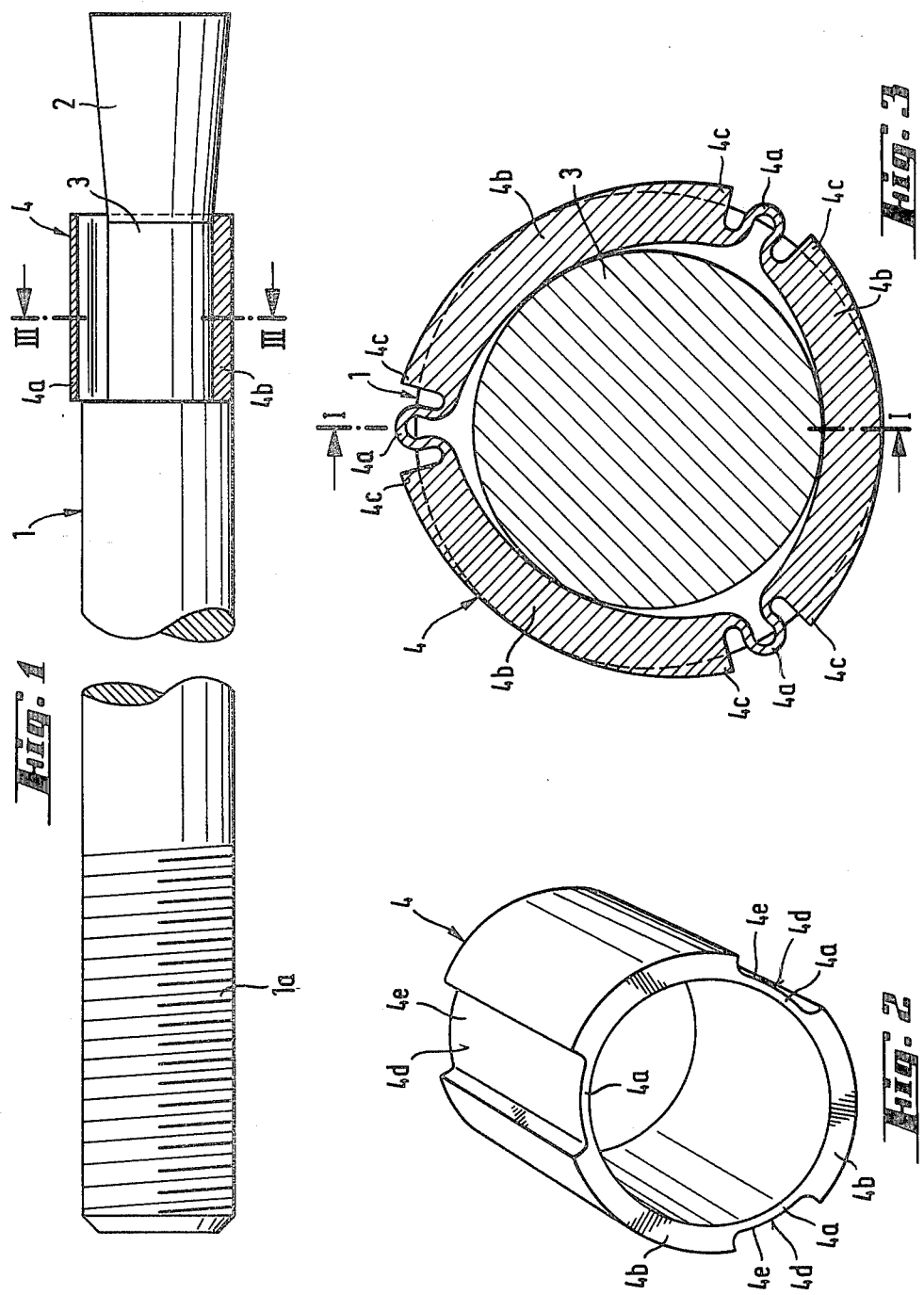

ANCHOR BOLT ASSEMBLY

SUMMARY OF THE INVENTION

The present invention is directed to an anchor bolt assembly including an anchor bolt and an expansion sleeve. The anchor bolt extends between a leading end and a trailing end. From its trailing end, the anchor bolt has a cylindrical bolt body with a thread extending from the trailing end. A frusto-conical part extends from the leading end toward the cylindrical bolt body. The maximum diameter of the frusto-conical part is substantially the same as the diameter of the bolt body. A cylindrically shaped reduced diameter part interconnects the bolt body and the reduced diameter part. The expansion sleeve fits onto the reduced diameter part and can be expanded in the radial direction. The reduced diameter part has a diameter corresponding to the minimum or least diameter of the frusto-conical part.

Anchor bolt assemblies of the above-mentioned type are frequently used in various forms because of their advantages. They are noted for high anchoring values and for good after-spreading characteristics. Further, such anchor bolt assemblies can be manufactured very economically, because of their simple design.

In such assemblies, the anchor bolts are formed of a cylindrical bolt body with a frusto-conical part at the leading end. Between the cylindrical bolt body and the frusto-conical part an axially extending cylindrical region is provided on which a radially outwardly deformable expansion sleeve is positioned. To support a load, a threaded nut is securable on the threaded trailing end of the bolt body.

To ensure that the bolt is anchored within a borehole, there must be relative movement between the bolt body and the expansion sleeve. During such movement, the frusto-conical part of the bolt at its leading end is pulled in the direction out of the borehole into the expansion sleeve, causing the sleeve to widen radially. During such displacement the bolt is pulled outwardly from the borehole by tightening the threaded nut on the thread as it bears against the surface in which the borehole is formed.

Since the expansion sleeve has a primary influence on the anchoring values achieved for the anchor bolt, its design is of paramount importance. Accordingly, the known types of anchor bolt assemblies differ only in the arrangement of the expansion sleeve.

One known expansion sleeve has an axially elongated slot permitting radial widening. This type of expansion sleeve has the disadvantage that it does not widen uniformly and there is an unequal distribution of the expansion pressure. By providing additional slots which traverse only a portion of the expansion sleeve causes the sleeve to tear open during the expanding action and does not result in any significant improvement, since the tearing action either does not occur at all or it results in undesired shock effects when it does occur. The expansion sleeves have been made of individual segments held together by plastic strips or similar elements, but such embodiments have had drawbacks, since the means used to hold the segments together can be separated from the sleeve when the anchor bolt assembly is placed in a borehole with the result that the sleeve separates into its individual parts before it reaches the proper location within the borehole.

Therefore, the primary object of the present invention is to provide an anchor bolt assembly for which reliable anchoring values can be attained and to provide the assembly with a simple design affording problem-free installation.

In accordance with the present invention, the expansion sleeve is provided with one or more webs extending in both the axial and circumferential direction so that the web is deformable in the circumferential direction. The web has a smaller thickness than the remainder of the sleeve wall. When the sleeve is placed on the anchor bolt, the webs can be deformed so that the inside surface of the sleeve moves inwardly into contact with the reduced diameter part of the bolt. Subsequently, in fixing the anchor bolt within a borehole, the sleeve is widened radially outwardly so that the previously deformed webs are stretched or expanded.

One particular advantage of the expansion sleeve embodying the present invention is that it is of a unitary or one-piece construction. With such an arrangement the anchor bolt can be placed within a borehole without any problems, particularly where it extends through the sleeve. Because of the deformable webs, the expansion sleeve can widen radially in a uniform manner as the frusto-conical part of the bolt is pulled into the sleeve. Accordingly, vibrations caused by shock-type expansion during the widening of the sleeve or during any after-spreading, are not possible.

The manufacture of the anchor bolt assembly is no more costly than the known anchor bolts. The expansion sleeve can be formed as an extruded section and because of its original undeformed shape it can be easily moved over the largest diameter dimension of the frusto-conical part. After it is fitted onto the anchor bolt in the region of the reduced diameter part, its webs can be easily deformed so that the inside surface of the sleeve bears against the surface of the reduced diameter part along axially extending surfaces.

Preferably, the webs in the expansion sleeve are formed by grooves in the outer surface of the sleeve, that is, the web extends between the bottom of the groove and the inside surface of the sleeve. The deformation of the webs can be determined in a simple manner due to the curvature of the sleeve. As the sleeve is deformed, the webs deform outwardly and assume a greater curvature as compared to the curvature of the remainder of the expansion sleeve. After the sleeve is deformed, the webs extend generally outwardly toward the outer surface of the sleeve assuming a somewhat U-shaped configuration.

The dimensioning of the webs and the type of material used for the expansion sleeve determine the deformation characteristic of the expansion sleeve and the manner in which it is spread radially outwardly. Preferably, the webs have a thickness of about 0.2 to 0.4 times the wall thickness of the sleeve and they extend angularly or circumferentially about the sleeve axis for about 2 to 4 times the wall thickness of the sleeve. In a preferred embodiment the expansion sleeve is made of commercial structural steel.

A particularly uniform distribution of the spreading or expanding forces is obtained when three equiangularly spaced webs are provided in the expansion sleeve. When the sleeve is deformed inwardly, each of the three axially extending wall parts between the webs move into contact with the reduced diameter part of the bolt. During the expansion operation, each of these three wall parts is pressed outwardly into contact with the surface of the borehole into which the anchor bolt is placed.

In its original condition, the expansion sleeve has a circular cylindrical inside surface. During production, there is the advantage that the extruded section can be of a simple tubular form with the formation of grooves in the outside surface of the tubular section leaving the webs extending from the inside surface of the sleeve to the base of the grooves. After the expansion sleeve is placed on the reduced diameter portion and is deformed inwardly, the circumferentially spaced arrangement of the webs affords a polygonally shaped member with the wall parts of the sleeve between the web each forming one side of the polygon and the corners being formed by the deformed webs. Since the wall thickness of the expansion sleeve corresponds to the difference in the radii of the cylindrically shaped body and the reduced diameter part of the anchor bolt, the polygonal contour of the deformed expansion sleeve has the advantage that the outside surfaces of the sleeve adjoining the webs project outwardly from the outer surface of the cylindrically shaped bolt body. These outwardly projecting parts of the expansion sleeve prevent rotation within the borehole and, in addition, ensure the commencement of the relative movement between the expansion sleeve and the anchor bolt by the engagement of the sleeve in the surface of the borehole.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a side view of the anchor bolt assembly embodying the present invention with the expansion sleeve shown in cross-section;

FIG. 2 is a perspective view of the expansion sleeve in its original condition; and FIG. 3 is a sectional view taken along the line III—III in FIG. 1, but illustrated on an enlarged scale.

DETAIL DESCRIPTION OF THE INVENTION

In FIG. 1 the anchor bolt assembly is illustrated with the anchor bolt formed by a cylindrically shaped bolt body 1, a frusto-conical part 2 and a reduced diameter part 3, and an expansion sleeve 4. As viewed in FIG. 1, the leading end of the anchor bolt is its right-hand end formed by the frusto-conical part 2 and its trailing end is the left-hand end. When the anchor bolt assembly is inserted into a borehole the frusto-conical part 2 is inserted first and the opposite threaded end 1a of the bolt projects outwardly from the borehole. Though not shown, a conventional threaded nut is secured onto the thread 1a of the bolt body 1 and is used to create a withdrawing force on the anchor bolt when it is to be expanded or anchored within the borehole.

As can be seen in FIGS. 1 and 3 and, particularly in FIG. 3, the reduced diameter part 3 is laterally enclosed by the expansion sleeve 4. Originally, the sleeve has an inside diameter so that it can be slipped on over the maximum diameter of the frusto-conical part 2 until it extends for the axial length of the reduced diameter part 3. In its original condition, the sleeve appears as shown in FIG. 2, however, once it is situated on the reduced diameter part 3, it is squeezed or deformed inwardly until the wall parts 4b extending between adjacent webs 4a contact the outside surface of the reduced diameter part 3 at locations spaced circumferentially from the webs 4a. When the expansion sleeve 4 is pressed inwardly into contact with the surface of the reduced diameter part 3, the curved wall parts 4b retain their original curvature while the webs 4a deform into a U-shaped configuration. As a result, the regions 4c on the outside surface of the sleeve adjoining the webs 4a project outwardly from the outside surface of the cylindrically shaped bolt body 1. When inserted within a borehole, the projecting regions 4c prevent rotation of the expansion sleeve and afford the relative movement between the bolt body 1 and the sleeve 4.

Expansion sleeve 5 is shown in its original condition in FIG. 2 before it is deformed onto the anchor bolt. In this original condition, the inside diameter of the expansion sleeve 4 is at least equal to the maximum diameter of the frusto-conical part 2 so that the sleeve can be slipped onto the anchor bolt over the frusto-conical part until it extends around the reduced diameter part 3. After the sleeve in its original condition extends over the axial length of the reduced diameter part 3, it is deformed inwardly by means of a tong-like tool until the inside surface of the sleeve contacts the outside surface of the reduced diameter part 3 in a number of locations. Because of the reduced thickness of the webs 4a, when the expansion sleeve 4 is deformed inwardly the webs formed by the bottom parts 4e of the grooves 4d cut into the outer surface of the expansion sleeve deform into the U-shaped configuration shown in FIG. 3. When the anchor bolt assembly is placed into a borehole the expansion sleeve 4 has the appearance shown in FIG. 3. Subsequently, when the bolt is anchored within the borehole, the bolt is pulled in the direction out of the borehole, that is, in the leftward direction as viewed in FIG. 1, so that the frusto-conical part 2 is pulled into the range of the expansion sleeve 4. During the anchoring operation, the frusto-conical part 2 forces the expansion sleeve 4 radially outwardly so that the webs are stretched until the desired anchoring effect is achieved.

In FIGS. 2 and 3, the expansion sleeve 4 has three equiangularly spaced webs 4a, however, this arrangement is only exemplary. Based on the specific situation, the number of the webs 4a can be varied.

Since the maximum diameter of the frusto-conical part 2 corresponds in a known manner to the outside diameter of the cylindrically shaped bolt body 1, it is not necessary to assemble the expansion sleeve onto the anchor bolt in the manner mentioned above, instead the expansion sleeve can be slipped over the axial length of the bolt body 1 until it is positioned along the axial range of the reduced diameter part 3.

While specific embodiments of the invention have been shown and described in detail to illustrate the application of the inventive principles, it will be understood that the invention may be embodied otherwise without departing from such principles.

I claim:

1. An anchor bolt assembly arranged to be inserted into and anchored within a borehole and including an anchor bolt and an expansion sleeve mounted on said anchor bolt, said anchor bolt having a leading end first inserted into the borehole and an opposite trailing end, said anchor bolt comprises an axially extending cylindrically shaped body extending from the trailing end toward the leading end, an axially extending frusto-conical part extending from the leading end toward the trailing end with the maximum diameter of said frusto-conical part being substantially the same as the diameter of said cylindrically shaped body, said frusto-conical part tapering inwardly in the direction from the leading end toward the trailing end, an axially extending reduced diameter part extending from said cylindrically shaped body to said frusto-conical part and having a diameter substantially the same as the minimum diameter of said frusto-conical part, wherein the improvement comprises an axially extending expansion sleeve extending continuously around and arranged to be fitted onto said reduced diameter part with the axis of said expansion sleeve extending in the direction of the axis of said anchor bolt, said sleeve having at least one web extending for a part of the circumferential direction of said sleeve and in the axial direction of said sleeve for the full length thereof and said web being deformable relative to the remainder of said sleeve, said web having a wall thickness in the radial direction of said sleeve considerably less than the corresponding wall thickness of said sleeve, said expansion sleeve being deformable from a first condition to a second condition with said expansion sleeve in the first condition having a cylindrically shaped outside surface and a minimum inside diameter at least equal to the maximum diameter of said frusto-conical part and in the second condition said expansion sleeve being deformed in the region of said web so that the inside surface thereof moves inwardly whereby the inside surface in circumferentially spaced locations is in surface contact with the surface of said reduced diameter part and said webs being expandable from the second condition for securing said anchor bolt within a borehole.

2. An anchor bolt assembly, as set forth in claim 1, wherein the outside surface of said expansion sleeve is grooved in the axial direction with the wall thickness of each said web being defined between the bottom surface of the groove and the inside surface of the said expansion sleeve.

3. An anchor bolt assembly, as set forth in claim 1 or 2, wherein each said web has a wall thickness in the range of 0.2 to 0.4 times the wall thickness of the sleeve between said webs.

4. An anchor bolt assembly, as set forth in claim 3, wherein the circumferential dimension of each said web is in the range of 2 to 4 times the wall thickness of said sleeve between said webs.

5. An anchor bolt assembly, as set forth in claim 4, wherein three angularly spaced webs are formed in said expansion sleeve.

6. An anchor bolt assembly, as set forth in claim 5, wherein the inside surface of said expansion sleeve has a circular cylindrical shape in the first condition.

7. An anchor bolt assembly, as set forth in claim 6, wherein the inside surface of said sleeve has a generally polygonally shaped configuration in the second condition thereof.

8. An anchor bolt assembly, as set forth in claim 7, wherein each said web is deformed into a generally U-shaped configuration in the second condition of said expansion sleeve.

9. An anchor bolt assembly, as set forth in claim 8, wherein the outside surfaces of said expansion sleeve adjacent said webs project outwardly from the outside diameter of said cylindrically shaped body in the second condition of said expansion sleeve.

10. An anchor bolt assembly, as set forth in claim 9, wherein in the second condition the inside surface of said expansion sleeve is in contact with said reduced diameter part at locations spaced angularly from said webs.

* * * * *